(12) United States Patent
Chan

(10) Patent No.: US 9,335,452 B2
(45) Date of Patent: May 10, 2016

(54) SYSTEM AND METHOD FOR CAPTURING IMAGES

(71) Applicant: Apple Inc., Cupertino, CA (US)

(72) Inventor: Ning Y. Chan, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 14/042,550

(22) Filed: Sep. 30, 2013

(65) Prior Publication Data

US 2015/0092102 A1    Apr. 2, 2015

(51) Int. Cl.
*G02B 5/08* (2006.01)
*H04N 5/225* (2006.01)
*H04N 5/238* (2006.01)

(52) U.S. Cl.
CPC .............. *G02B 5/08* (2013.01); *H04N 5/2254* (2013.01); *H04N 5/2259* (2013.01); *H04N 5/238* (2013.01)

(58) Field of Classification Search
CPC . H04N 1/0423; H04N 5/2254; H04N 5/2259; H04N 5/238; G02B 26/08; G02B 6/35; G02B 5/08
USPC ......................................... 348/344, 360, 361
See application file for complete search history.

(56) References Cited

U.S. PATENT DOCUMENTS

| | | | |
|---|---|---|---|
| 6,992,699 B1 | 1/2006 | Vance et al. | |
| 8,194,138 B2 * | 6/2012 | Shen | 348/337 |
| 8,317,688 B2 * | 11/2012 | Glozman et al. | 600/173 |
| 2007/0189763 A1 | 8/2007 | Kojima et al. | |
| 2008/0019684 A1 | 1/2008 | Shyu et al. | |
| 2009/0128664 A1 | 5/2009 | He et al. | |
| 2013/0258152 A1 | 10/2013 | Balannik et al. | |
| 2014/0055624 A1 * | 2/2014 | Gaines et al. | 348/207.1 |

FOREIGN PATENT DOCUMENTS

| | | |
|---|---|---|
| JP | H104540 | 6/1998 |
| WO | 2014031321 | 2/2014 |

OTHER PUBLICATIONS

International Search Report and Written Opinion from PCT/US2014/051806, issued Nov. 10, 2014, Apple Inc., pp. 1-13.

* cited by examiner

*Primary Examiner* — Nhan T Tran
(74) *Attorney, Agent, or Firm* — Robert C. Kowert; Meyertons, Hood, Kivlin, Kowert & Goetzel, P.C.

(57) ABSTRACT

Systems and methods for capturing images are disclosed. An image capture device includes two or more apertures for directing light to an image sensor device. In some embodiments, each of the apertures admits light from a different direction relative to the image sensor device. Some embodiments include one or more electrically switchable mirror elements configured for directing light from at least one of the one or more apertures to the image sensor. Upon application of a first signal, a first electrically switchable mirror element enters a reflective mode for reflecting light from a first aperture of the one or more apertures to the image sensor device. Upon application of a second signal, the first electrically switchable mirror element enters a transmissive mode for transmitting light from a second aperture of the one or more apertures to the image sensor device.

17 Claims, 12 Drawing Sheets

SYSTEM AND METHOD FOR CAPTURING IMAGES

BACKGROUND

1. Technical Field

This disclosure relates generally to capturing images, and, more specifically, to capturing images from multiple directions.

2. Description of the Related Art

It is common to include high-end miniature cameras in wireless or cellular telephones, computers, tablets, and other portable multifunction devices, whereby the user of the object can capture with digital image sensors various representations of the environment present around the multifunction device. Increasingly, these multifunction devices include multiple cameras or other similar image capture devices pointed in different directions.

The desire for multiple image capture devices in multifunction devices presents several associated problems. Each additional image capture device pointing in an additional direction presents an additional possibility for device failure and additional cost of materials for sensors, lenses and control hardware. Further, the addition of each image capture device increases the complexity of control software.

SUMMARY OF EMBODIMENTS

Systems and methods for capturing images are disclosed. An image capture device includes two or more apertures for directing light to an image sensor device. In some embodiments, each of the apertures admits light from a different direction relative to the image sensor device. Some embodiments include one or more electrically switchable mirror elements configured for directing light from at least one of the one or more apertures to the image sensor. Upon application of a first signal, a first electrically switchable mirror element enters a reflective mode for reflecting light from a first aperture of the one or more apertures to the image sensor device. Upon application of a second signal, the first electrically switchable mirror element enters a transmissive mode for transmitting light from a second aperture of the one or more apertures to the image sensor device.

Figure 1:
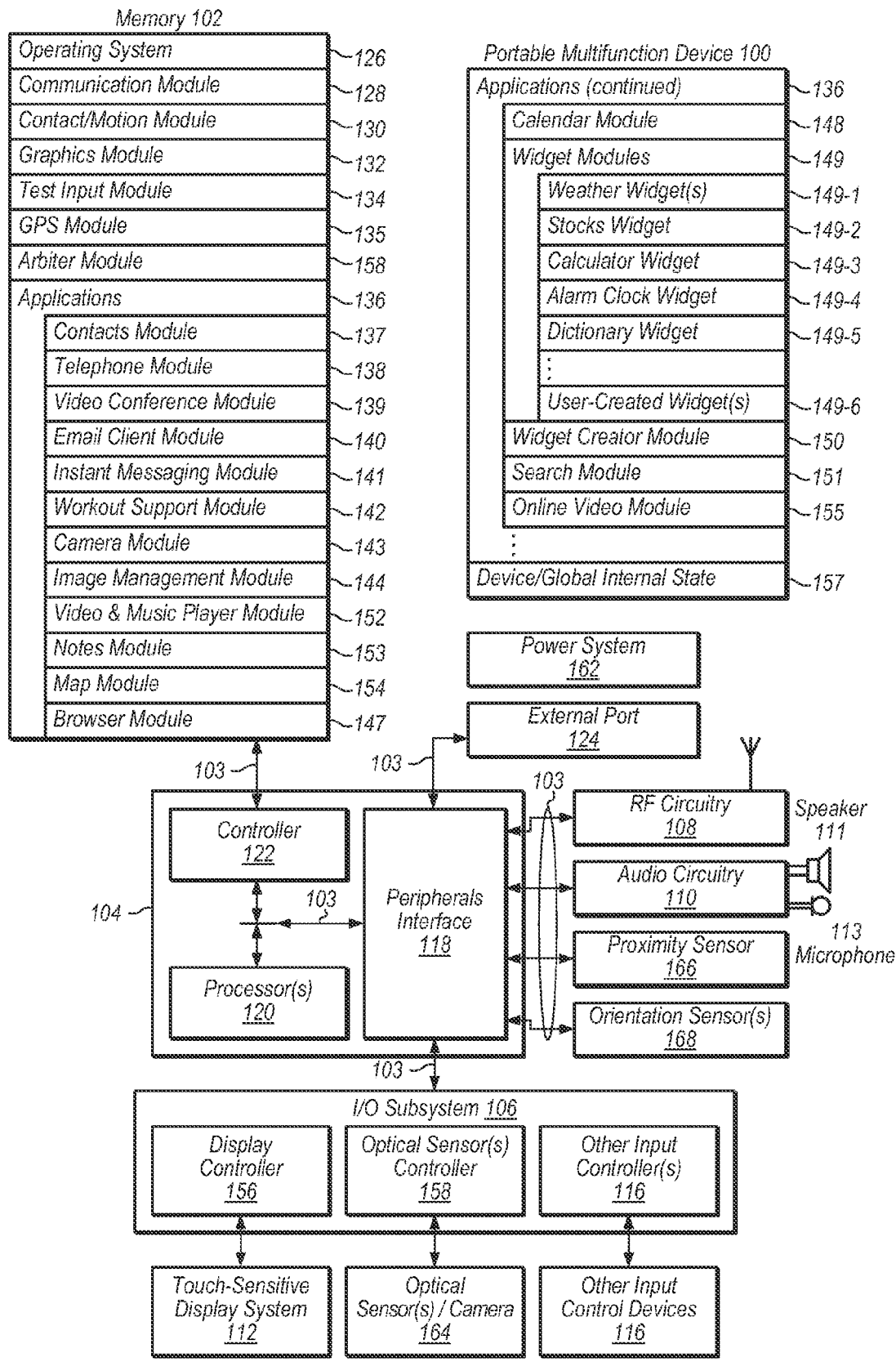
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of systems and methods for image capture are disclosed. In some embodiments, an image capture device includes two or more apertures for directing light to an image sensor device. In some embodiments, each of the apertures admits light from a different direction relative to the image sensor device. One or more electrically switchable mirror elements is configured for directing light from at least one of the one or more apertures to the image sensor. Upon application of a first signal, a first electrically switchable mirror element enters a reflective mode for reflecting light from a first aperture of the one or more apertures to the image sensor device. Upon application of a second signal, the first electrically switchable mirror element enters a transmissive mode for transmitting light from a second aperture of the one or more apertures to the image sensor device.

In some embodiments, the one or more one or more electrically switchable mirror elements further include a second electrically switchable mirror element. Upon application of a third signal, the second electrically switchable mirror element enters a complementary transmissive mode for transmitting light from the first aperture of the one or more apertures to the image sensor device. The complementary transmissive mode is activated at a time to complement the reflective mode of the reflective mode first electrically switchable mirror element. Upon application of a fourth signal, the second electrically switchable mirror element enters a complementary reflective mode for reflecting light from the first aperture of the one or more apertures away from the image sensor device. The complementary reflective mode is activated at a time to complement the transmissive mode of the first electrically switchable mirror element.

In some embodiments, the first aperture and the second aperture are equidistant from the image sensor device. Some embodiments further include the image sensor device and a moveable lens apparatus capable of moving a lens assembly of the image capture device relative to the image sensor device to compensate for a difference between a distance from the first aperture to the image sensor device and a distance from the second aperture to the image sensor device.

In some embodiments, the first aperture admits light from a location opposite the second aperture relative to the image sensor device. In some embodiments, the first aperture is situated at a first distance from the image sensor device. The second aperture is situated at a second distance from the image sensor device. The first distance is greater than the second distance.

Some embodiments further include a mirror element for directing light from a second aperture of the one or more apertures to the image sensor device. Some embodiments further include the image sensor device.

Some embodiments include methods for capturing images. In some embodiments, the methods include causing an image capture device having two or more apertures for directing light to an image sensor device to perform, upon application of a first signal, placing a first electrically switchable mirror element in a reflective mode for reflecting light from a first aperture of one or more apertures to an image sensor device, and upon application of a second signal, placing the first electrically switchable mirror element in a transmissive mode for transmitting light from a second aperture of the one or more apertures to the image sensor device. Some embodiments further include capturing an image at an image sensor device. Each of the apertures admits light from a different direction relative to the image sensor device.

Some embodiments further include, upon application of a third signal, placing a second electrically switchable mirror element in a complementary transmissive mode for transmitting light from the first aperture of the one or more apertures to the image sensor device, and upon application of a fourth signal, placing the second electrically switchable mirror element in a complementary reflective mode for reflecting light from the first aperture of the one or more apertures away from the image sensor device.

Some embodiments further include causing movement of a lens assembly of the image capture device relative to the image sensor device to compensate for a difference between a distance from the first aperture to the image sensor device and a distance from the second aperture to the image sensor device. In some embodiments the complementary transmissive mode is activated at a time to complement the reflective mode of the reflective mode first electrically switchable mirror element, and the complementary reflective mode is activated at a time to complement the transmissive mode of the first electrically switchable mirror element. Some embodiments further include, upon application of a third signal, placing a second electrically switchable mirror element in a semi-transmissive mode for transmitting light from the first aperture of the one or more apertures to the image sensor device, and upon application of a fourth signal, placing the first electrically switchable mirror element in a complementary semi-reflective mode for reflecting light from the second aperture of the one or more apertures to the image sensor device. Some embodiments further include capturing an interlaced image at an image sensor device. Each of the apertures admits light from a different direction relative to the image sensor device.

Some embodiments may include a means for capturing an image, as described herein. For example, in camera module may perform causing an image capture device having two or more apertures for directing light to an image sensor device to perform, upon application of a first signal, placing a first electrically switchable mirror element in a reflective mode for reflecting light from a first aperture of one or more apertures to an image sensor device, and upon application of a second signal, placing the first electrically switchable mirror element in a transmissive mode for transmitting light from a second aperture of the one or more apertures to the image sensor device, as described herein. The camera module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform causing an image capture device having two or more apertures for directing light to an image sensor device to perform, upon application of a first signal, placing a first electrically switchable mirror element in a reflective mode for reflecting light from a first aperture of one or more apertures to an image sensor device, and upon application of a second signal, placing the first electrically switchable mirror element in a transmissive mode for transmitting light from a second aperture of the one or more apertures to the image sensor device, as described herein. Other embodiments of an image capture module may be at least partially implemented by hardware circuitry and/or firmware stored, for example, in a non-volatile memory.

Some embodiments include a computing device. In some embodiments, the computing device includes a processor and an image capture device having two or more apertures for directing light to an image sensor device. In some embodiments, the image capture device is configured to perform, upon application of a first signal, placing a first electrically switchable mirror element in a reflective mode for reflecting light from a first aperture of one or more apertures to an image sensor device, upon application of a second signal, placing the first electrically switchable mirror element in a transmissive mode for transmitting light from a second aperture of the one or more apertures to the image sensor device, and capturing an image at an image sensor device. In some embodiments, each of the apertures admits light from a different direction relative to the image sensor device. In some embodiments, the computing device includes a display unit under control of the processor for displaying images captured by the image capture device.

In some embodiments, the image capture device is further configured to perform, upon application of a third signal, placing a second electrically switchable mirror element in a complementary transmissive mode for transmitting light from the first aperture of the one or more apertures to the image sensor device, and upon application of a fourth signal, placing the second electrically switchable mirror element in a complementary reflective mode for reflecting light from the first aperture of the one or more apertures away from the image sensor device. In some embodiments, the image capture device is further configured to perform moving a lens assembly of the image capture device relative to the image sensor device to compensate for a difference between a distance from the first aperture to the image sensor device and a distance from the second aperture to the image sensor device. In some embodiments, the complementary transmissive mode is activated at a time to complement the reflective mode of the reflective mode first electrically switchable mirror element. In some embodiments, the complementary reflective mode is activated at a time to complement the transmissive mode of the first electrically switchable mirror element.

In some embodiments, the computing device is further configured to perform, upon application of a third signal, placing a second electrically switchable mirror element in a semi-transmissive mode for transmitting light from the first aperture of the one or more apertures to the image sensor device, and upon application of a fourth signal, placing the first electrically switchable mirror element in a complementary semi-reflective mode for reflecting light from the second aperture of the one or more apertures to the image sensor device. In some embodiments, the image capture device is further configured to perform capturing an interlaced image at an image sensor device, wherein each of the apertures admits light from a different direction relative to the image sensor device.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal, without departing from the intended scope. The first signal and the second signal are both signals, but they are not the same signal.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop or laptop computer with a camera. In some embodiments, the device is a gaming computer with cameras (e.g., in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors/cameras 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors/cameras 164. The terms optical sensor and camera are used interchangeably herein. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video module and a music module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, arbiter module 158 negotiates control of a shared audio or visual resource.

In conjunction with RF circuitry 108, audio circuitry 110, speaker 111, microphone 113, touch screen 112, display controller 156, optical sensor 164, arbiter module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad.

By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
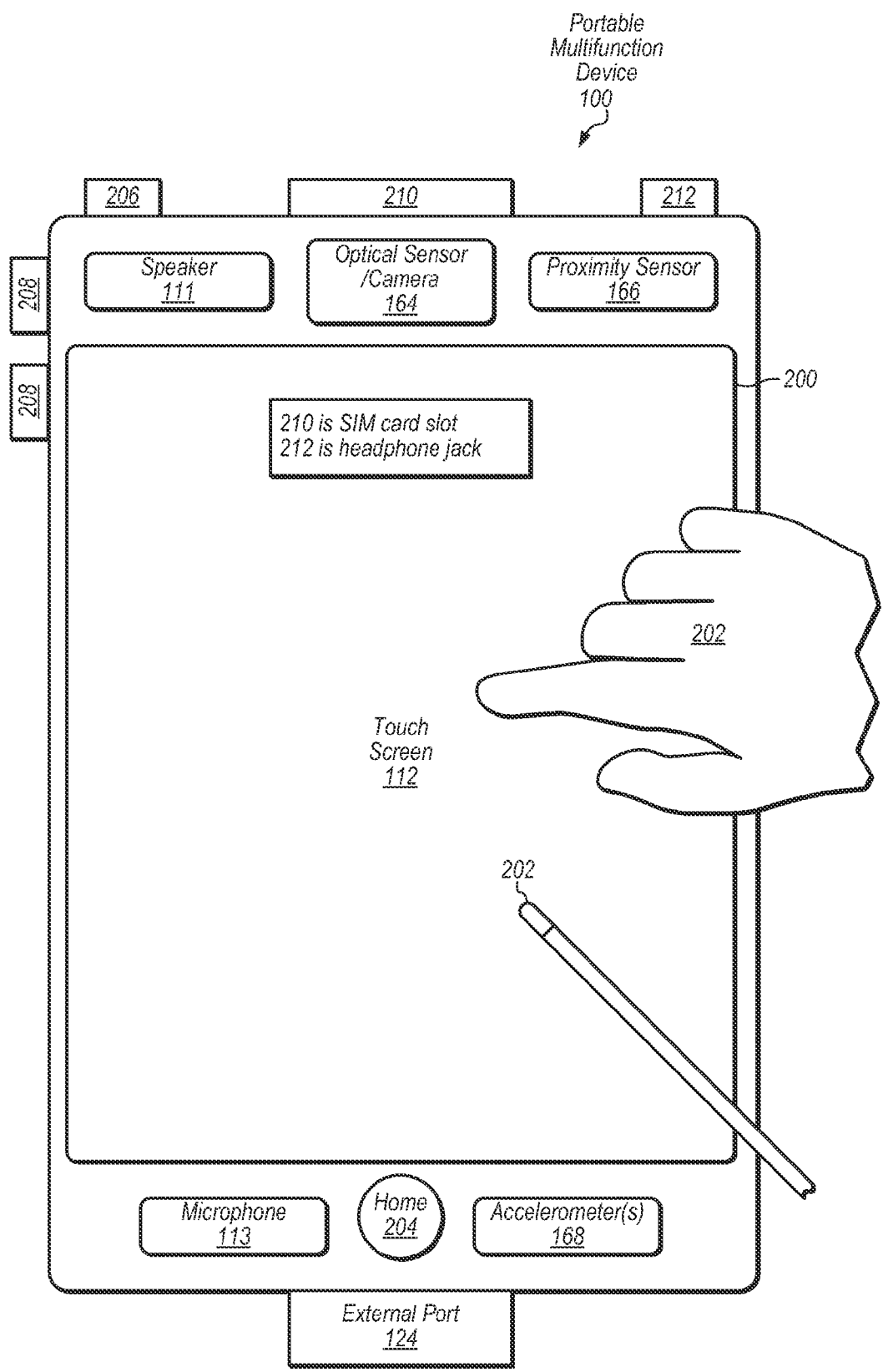
FIG. 2 depicts a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Example Hardware

Figure 3A:
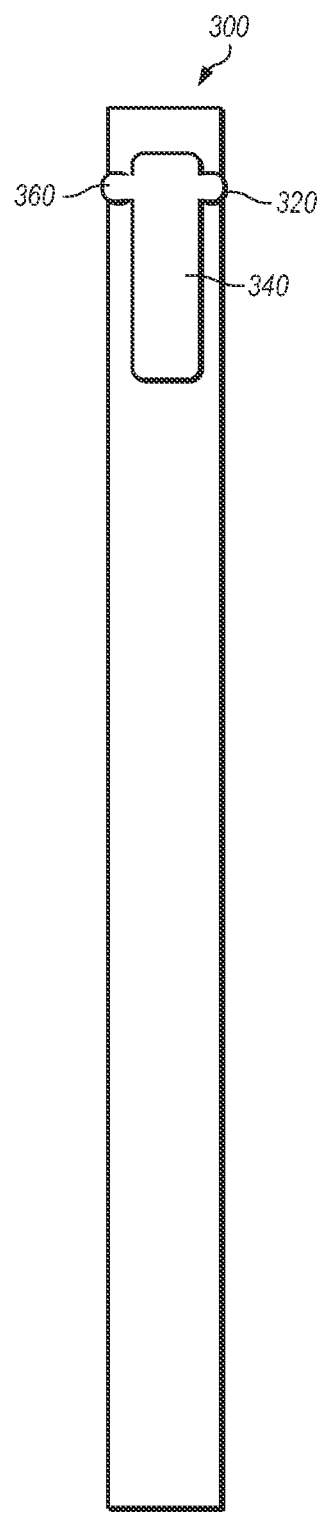
FIG. 3A illustrates placement of an image capture device in a portable multifunction device in accordance with some embodiments.

FIG. 3A illustrates placement of an image capture device in a portable multifunction device in accordance with some embodiments. In a portable multifunction device 300, an image capture device 340 includes two or more apertures 320 and 360 for directing light to an image sensor device (not shown). In some embodiments, each of the apertures 320 and 360 admits light from a different direction relative to the image sensor device 340. In some embodiments, the first aperture 320 admits light from a location opposite the second aperture 360 relative to the image sensor device.

Figure 3B:
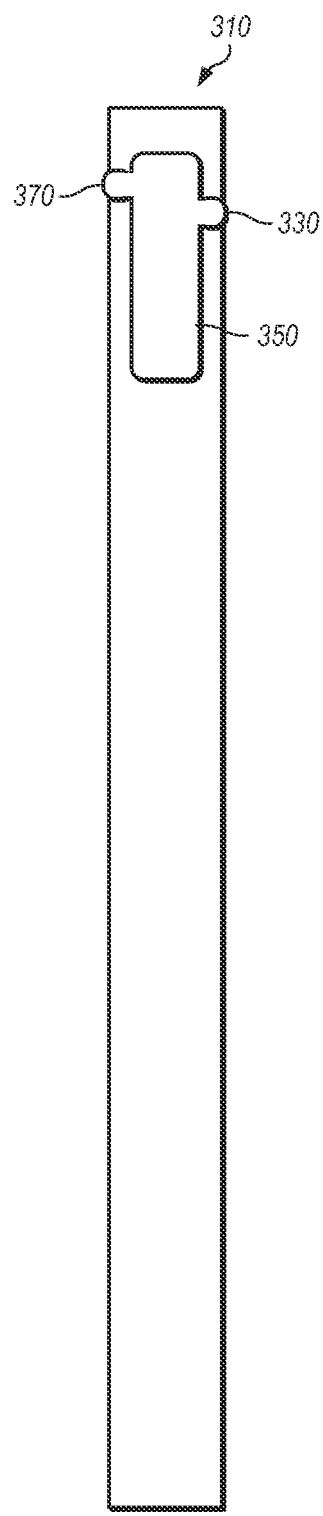
FIG. 3B depicts placement of an image capture device in a portable multifunction device in accordance with some embodiments.

FIG. 3B depicts placement of an image capture device in a portable multifunction device in accordance with some embodiments. In a portable multifunction device 310, an image capture device 340 includes two or more apertures 330 and 370 for directing light to an image sensor device (not shown). In some embodiments, each of the apertures 330 and 370 admits light from a different direction relative to the image sensor device 350. In some embodiments, the first aperture 370 is situated at a first distance from the image sensor device. The second aperture 330 is situated at a second distance from the image sensor device. The first distance is greater than the second distance. Some embodiments further include the image sensor device and a moveable lens apparatus capable of moving a lens assembly of the image capture device relative to the image sensor device to compensate for a difference between a distance from the first aperture 370 to the image sensor device and a distance from the second aperture 330 to the image sensor device. Some embodiments further include a mirror element (not shown) for directing light from first aperture 370 of the one or more apertures to the image sensor device. Some embodiments further include the image sensor device.

Figure 4:
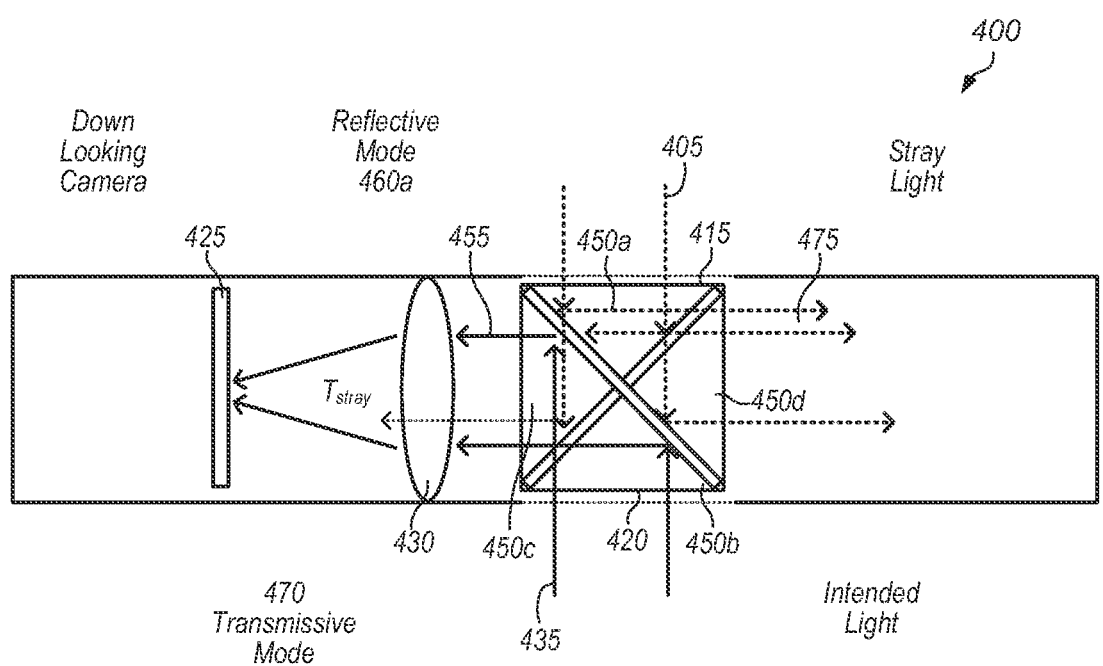
FIG. 4 illustrates one embodiment of an image capture device for use in a portable multifunction device in accordance with some embodiments.

FIG. 4 illustrates one embodiment of an image capture device for use in a portable multifunction device in accordance with some embodiments. An image capture device 400 includes an image sensor device 425 for capturing images receive through a lens 430. Image capture device 400 includes two or more apertures 415 and 420 for directing light 405 and 435 to an image sensor device 425. In some embodiments, each of the apertures 415 and 420 admits light 405 and 435 from a different direction relative to the image sensor device 425. In the embodiment shown, one or more electrically switchable mirror elements 460 and 470 is mounted in a set of transparent support structures 450a-450d. Alternative embodiments include alternative arrangements for mounting the one or more electrically switchable mirror elements 460 and 470, such as frames suspending edges of the one or more electrically switchable mirror elements 460 and 470. Likewise, while two electrically switchable mirror elements 460 and 470 are shown, more or fewer electrically switchable mirror elements 460 and 470 are used by some embodiments, and some embodiments employ electrically switchable mirror elements 460 and 470 that are arrays composed of multiple pieces, while in some embodiments each of electrically switchable mirror elements 460 and 470 are single-piece units. The one or more electrically switchable mirror elements 460 and 470 is configured for directing light 435 from at least one of the one or more apertures 420 toward the lens 430 (see reflected light 455) and then to the image sensor 425. Stray light 415 is reflected away (as reflected light 475) from the electrically switchable mirror element 460.

Upon application of a first signal, a first electrically switchable mirror element 460 enters a reflective mode for reflecting light from a first aperture of the one or more apertures 420 to the image sensor device 425. Upon application of a second signal, the first electrically switchable mirror element 460 enters a transmissive mode (not shown) for transmitting light 405 from a second aperture 415 of the one or more apertures to the image sensor device 425.

In some embodiments, the one or more one or more electrically switchable mirror elements 460 and 470 further include a second electrically switchable mirror element 470. In some embodiments, the first aperture 415 and the second aperture 420 are equidistant from the image sensor device 425. In some embodiments, the first aperture 415 admits light from a location opposite the second aperture 420 relative to the image sensor device 425.

Figure 5:
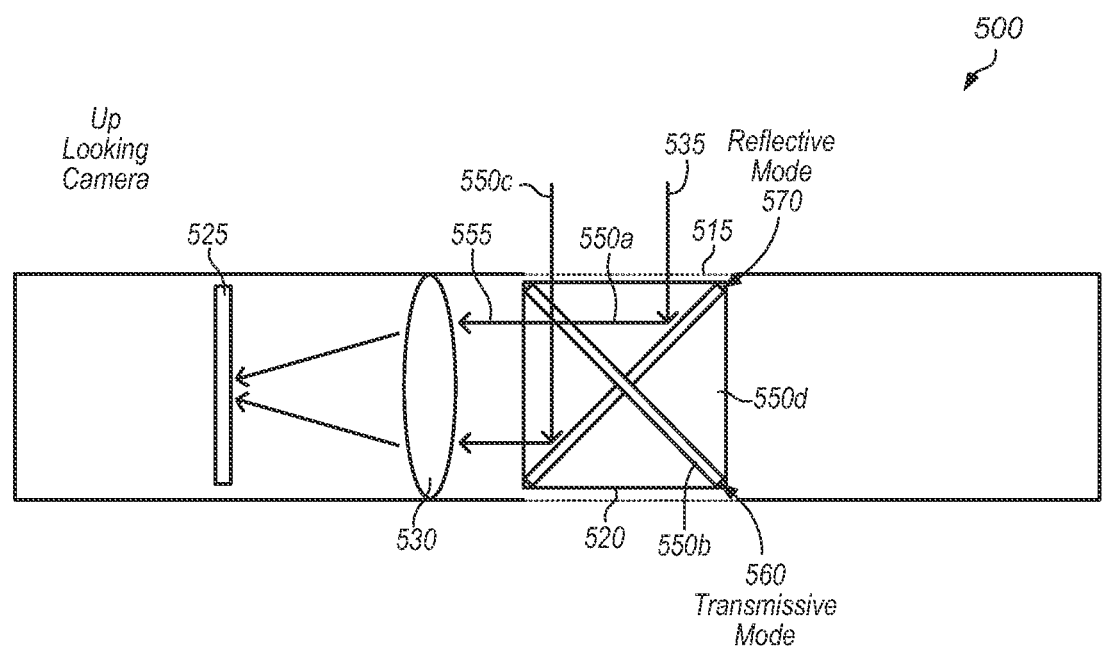
FIG. 5 depicts one embodiment of an image capture device for use in a portable multifunction device in accordance with some embodiments.

FIG. 5 depicts one embodiment of an image capture device for use in a portable multifunction device in accordance with some embodiments. An image capture device 500 for capturing images received through a lens 530 includes two or more apertures 515 and 520 for directing light 535 to an image sensor device. In some embodiments, each of the apertures 515 and 520 admits light 535 from a different direction relative to an image sensor device 525. One or more electrically switchable mirror elements 560 and 570 is configured for directing light 535 from at least one of the one or more apertures 515 to the image sensor 525. Upon application of a first signal, a first electrically switchable mirror element enters a reflective mode for reflecting light from a first aperture of the one or more apertures to the image sensor device. Such a state is shown in FIG. 4 and described above. Upon application of a second signal, the first electrically switchable mirror element 560 enters a transmissive mode for transmitting light 555 from a second aperture 515 of the one or more apertures to the image sensor device 525.

In some embodiments, the one or more one or more electrically switchable mirror elements 560 and 570 further include a second electrically switchable mirror element 570. Upon application of a third signal, the second electrically switchable mirror element 570 enters a complementary transmissive mode (not shown) for transmitting light from the first aperture 520 of the one or more apertures to the image sensor device 525. The complementary transmissive mode is activated at a time to complement the reflective mode of the reflective mode first electrically switchable mirror element 560. Upon application of a fourth signal, the second electrically switchable mirror element 570 enters a complementary reflective mode (not shown) for reflecting light from the first aperture of the one or more apertures away from the image sensor device 525. The complementary reflective mode is activated at a time to complement the transmissive mode of the first electrically switchable mirror element 560.

In some embodiments, the first aperture 520 and the second aperture 515 are equidistant from the image sensor device 525. In some embodiments, the first aperture 520 admits light from a location opposite the second aperture 515 relative to the image sensor device 525. In the embodiment shown, one or more electrically switchable mirror elements 560 and 570 is mounted in a set of transparent support structures 550a-550d. Alternative embodiments include alternative arrangements for mounting the one or more electrically switchable mirror elements 560 and 570, such as frames suspending edges of the one or more electrically switchable mirror elements 560 and 570. Likewise, while two electrically switchable mirror elements 560 and 570 are shown, more or fewer electrically switchable mirror elements 560 and 570 are used by some embodiments, and some embodiments employ electrically switchable mirror elements 560 and 570 that are made arrays of multiple pieces, while in some embodiments each of electrically switchable mirror elements 560 and 570 are single-piece units.

Figure 6:
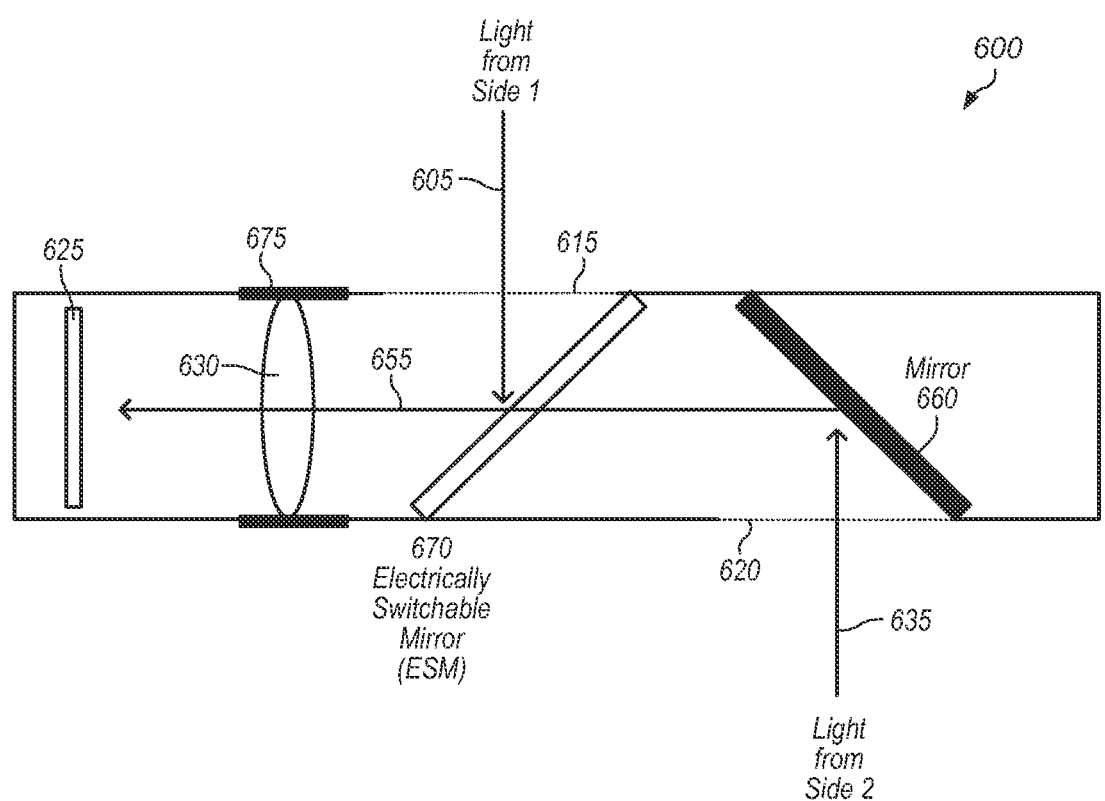
FIG. 6 illustrates one embodiment of an image capture device for use in a portable multifunction device in accordance with some embodiments.

FIG. 6 illustrates one embodiment of an image capture device for use in a portable multifunction device in accordance with some embodiments. An image capture device 600 for capturing images composed of light 655 received through a lens 630 includes two or more apertures 615 and 620 for directing light 605 and 636 to an image sensor device 625. In some embodiments, each of the apertures 615 and 620 admits light from a different direction relative to the image sensor device 625. One or more electrically switchable mirror elements 670 is configured for directing light from at least one of the one or more apertures 615 and 620 to the image sensor 625. Upon application of a first signal, a first electrically switchable mirror element 670 enters a reflective mode (not shown) for reflecting light 605 from a first aperture 615 of the one or more apertures 615 and 620 to the image sensor device 620. Upon application of a second signal, the first electrically switchable mirror element 670 enters a transmissive mode (shown) for transmitting light 635 from a second aperture 620 of the one or more apertures 615 and 620 to the image sensor device 625.

Some embodiments further include the image sensor device 625 and a moveable lens apparatus capable of moving a lens assembly 675 of the image capture device 600 relative to the image sensor device 625 to compensate for a difference between a distance from the first aperture 615 to the image sensor device 625 and a distance from the second aperture 620 to the image sensor device 625.

In some embodiments, the first aperture 615 admits light from a location opposite the second aperture 620 relative to the image sensor device 625. In some embodiments, the first aperture 615 is situated at a first distance from the image sensor device. The second aperture 620 is situated at a second distance from the image sensor device 625. The first distance is less than the second distance.

Some embodiments further include a mirror element 660 for directing light from a second aperture 620 of the one or more apertures 615 and 620 to the image sensor device 625. Some embodiments further include the image sensor device 625.

Example Operations

Figure 7:
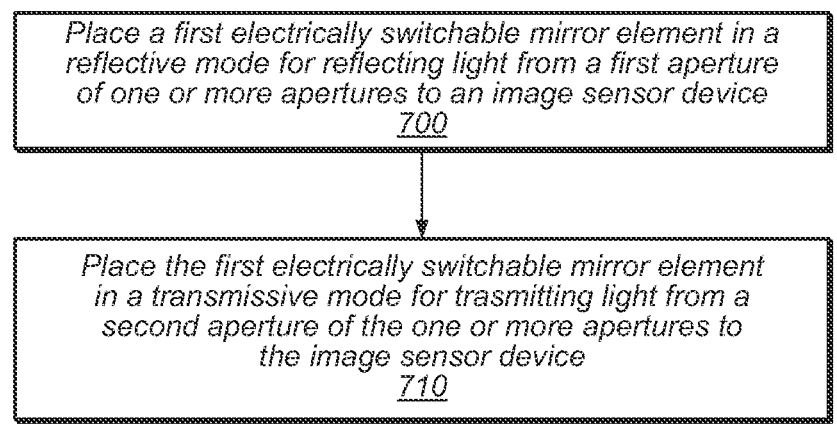
FIG. 7 is a flow diagram illustrating one embodiment of a method for operating an image capture device for use in a portable multifunction device in accordance with some embodiments.

FIG. 7 is a flow diagram illustrating one embodiment of a method for operating an image capture device for use in a portable multifunction device in accordance with some embodiments. A first electrically switchable mirror element is placed in a reflective mode for reflecting light from a first aperture of one or more apertures to an image sensor device (block 700). The first electrically switchable mirror element is placed in a transmissive mode for transmitting light from a second aperture of the one or more apertures to the image sensor device (block 710).

Figure 8:
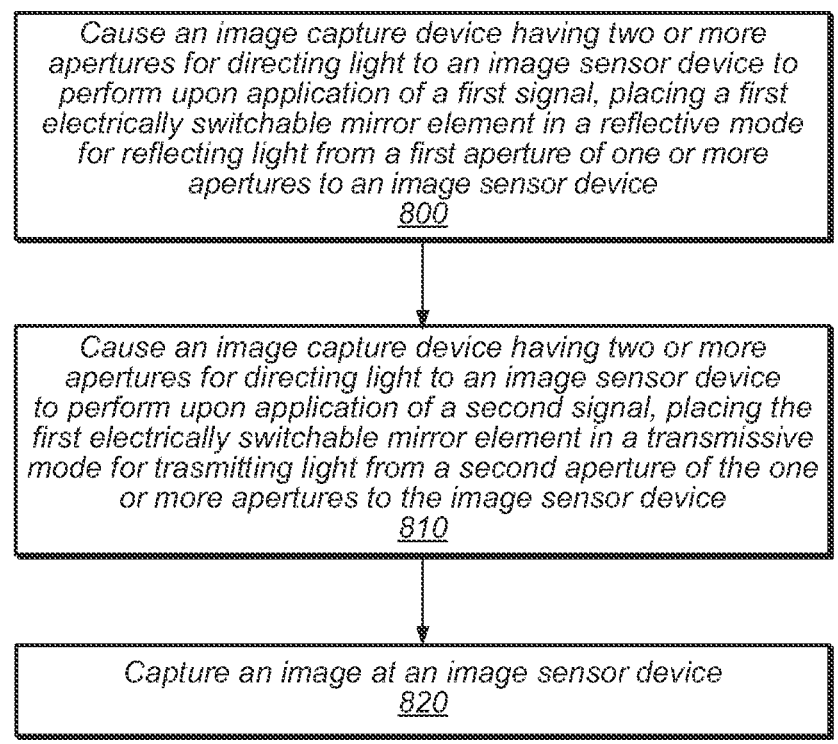
FIG. 8 is a flow diagram illustrating one embodiment of a method for operating an image capture device for use in a portable multifunction device in accordance with some embodiments.

FIG. 8 is a flow diagram illustrating one embodiment of a method for operating an image capture device for use in a portable multifunction device in accordance with some embodiments. An image capture device having two or more apertures for directing light to an image sensor device performs, upon application of a first signal, placing a first electrically switchable mirror element in a reflective mode for reflecting light from a first aperture of one or more apertures to an image sensor device (block 800). An image capture device having two or more apertures for directing light to an image sensor device performs, upon application of a second signal, placing the first electrically switchable mirror element in a transmissive mode for transmitting light from a second aperture of the one or more apertures to the image sensor device (block 810). An image is captured at an image sensor device (block 820).

Figure 9:
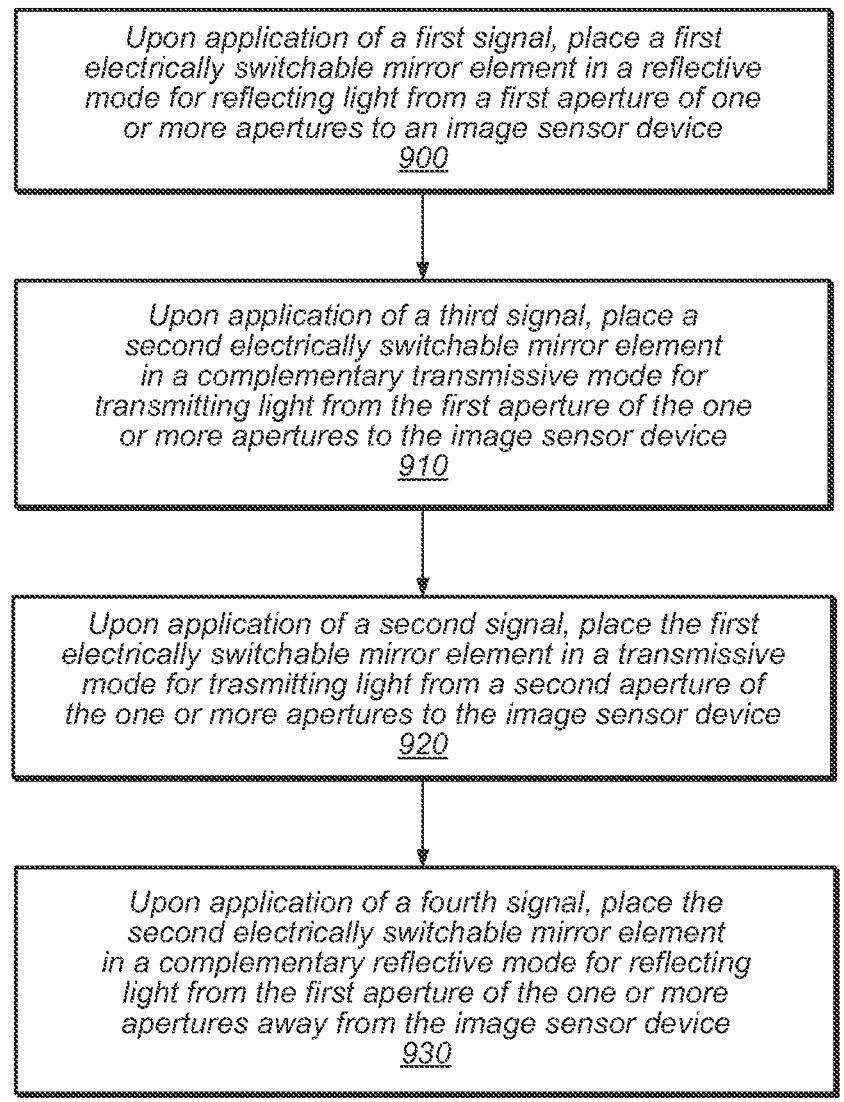
FIG. 9 is a flow diagram illustrating one embodiment of a method for operating an image capture device for use in a portable multifunction device in accordance with some embodiments.

FIG. 9 is a flow diagram illustrating one embodiment of a method for operating an image capture device for use in a portable multifunction device in accordance with some embodiments. Upon application of a first signal, a first electrically switchable mirror element is placed in a reflective mode for reflecting light from a first aperture of one or more apertures to an image sensor device (block 900). Upon application of a third signal, a second electrically switchable mirror element is placed in a complementary transmissive mode for transmitting light from the first aperture of the one or more apertures to the image sensor device (block 910). Upon application of a second signal, the first electrically switchable mirror element is placed in a transmissive mode for transmitting light from a second aperture of the one or more apertures to the image sensor device (block 920). Upon application of a fourth signal, the second electrically switchable mirror element is placed in a complementary reflective mode for reflecting light from the first aperture of the one or more apertures away from the image sensor device (block 930).

Figure 10:
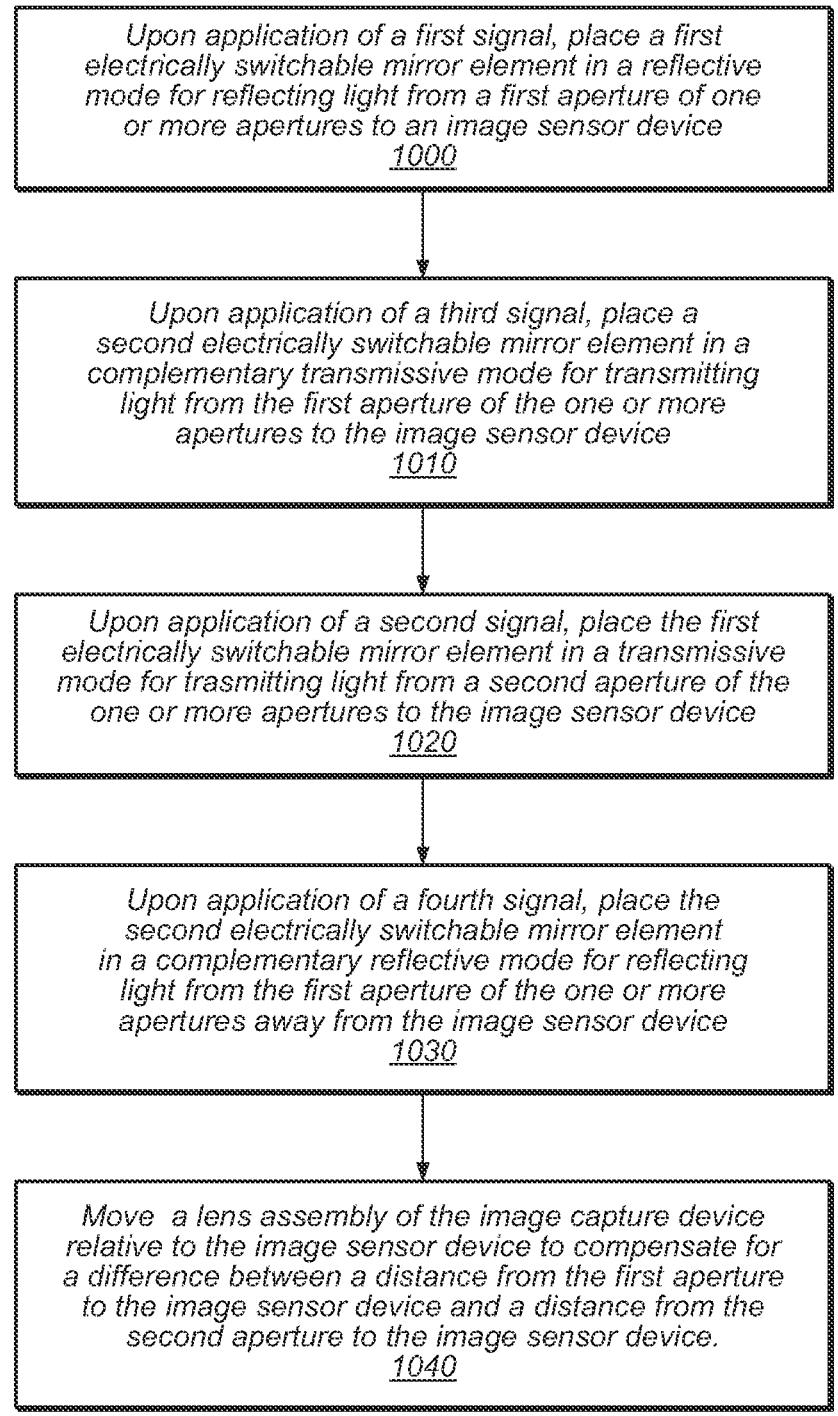
FIG. 10 is a flow diagram illustrating one embodiment of a method for operating an image capture device for use in a portable multifunction device in accordance with some embodiments.

FIG. 10 is a flow diagram illustrating one embodiment of a method for operating an image capture device for use in a portable multifunction device in accordance with some embodiments. Upon application of a first signal, a first electrically switchable mirror element is placed in a reflective mode for reflecting light from a first aperture of one or more apertures to an image sensor device (block 1000). Upon application of a third signal, place a second electrically switchable mirror element in a complementary transmissive mode for transmitting light from the first aperture of the one or more apertures to the image sensor device (block 1010). Upon application of a second signal, the first electrically switchable mirror element is placed in a transmissive mode for transmitting light from a second aperture of the one or more apertures to the image sensor device (block 1020). Upon application of a fourth signal, the second electrically switchable mirror element is placed in a complementary reflective mode for reflecting light from the first aperture of the one or more apertures away from the image sensor device (block 1030). A lens assembly of the image capture device is moved relative to the image sensor device to compensate for a difference between a distance from the first aperture to the image sensor device and a distance from the second aperture to the image sensor device. (block 1040).

Figure 11:
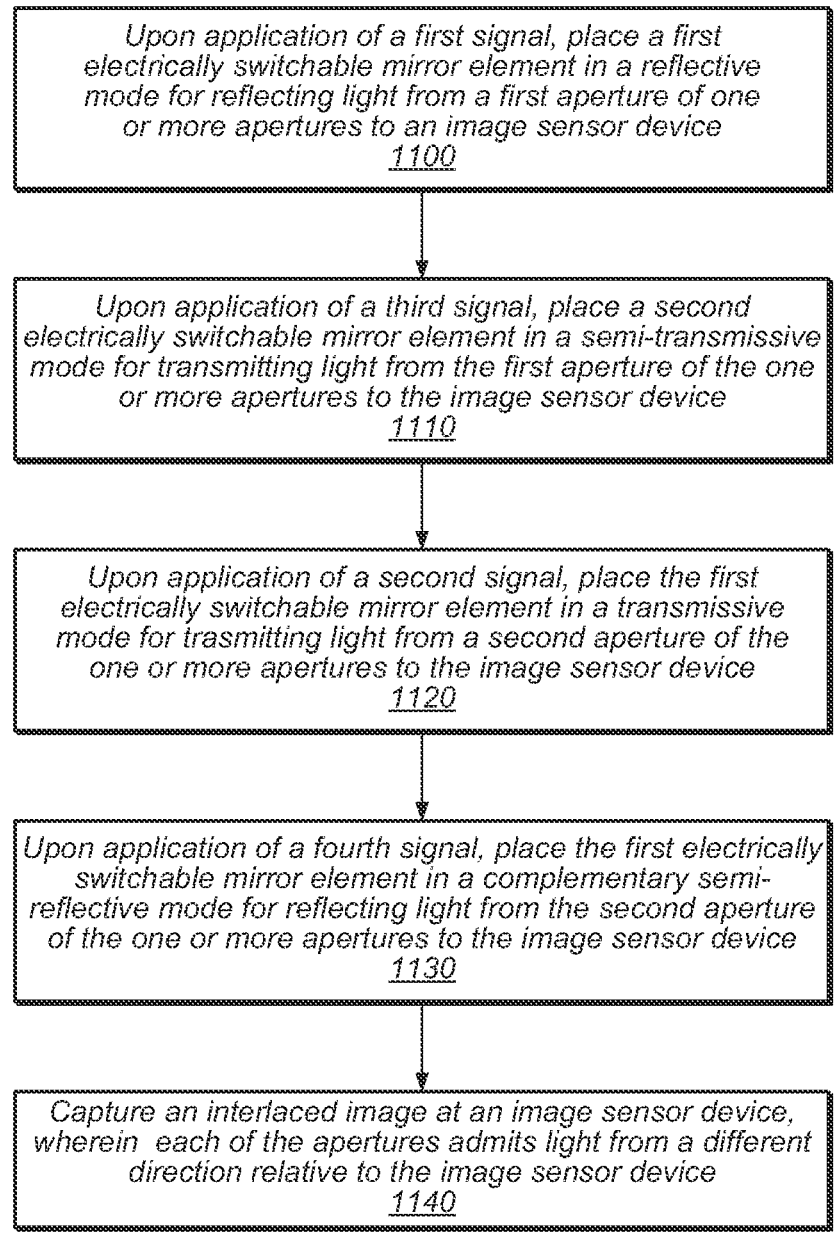
FIG. 11 is a flow diagram illustrating one embodiment of a method for operating an image capture device for use in a portable multifunction device in accordance with some embodiments.

FIG. 11 is a flow diagram illustrating one embodiment of a method for operating an image capture device for use in a portable multifunction device in accordance with some embodiments. Upon application of a first signal, a first electrically switchable mirror element is placed in a reflective mode for reflecting light from a first aperture of one or more apertures to an image sensor device (block 1100). Upon application of a third signal, a second electrically switchable mirror element is placed in a semi-transmissive mode for transmitting light from the first aperture of the one or more apertures to the image sensor device (block 1110). Upon application of a second signal, the first electrically switchable mirror element is placed in a transmissive mode for transmitting light from a second aperture of the one or more apertures to the image sensor device (block 1120). Upon application of a fourth signal, the first electrically switchable mirror element is placed in a complementary semi-reflective mode for reflecting light from the second aperture of the one or more apertures to the image sensor device (block 1130). An interlaced image is captured at an image sensor device, wherein each of the apertures admits light from a different direction relative to the image sensor device (block 1140).

Example Computer System

Figure 12:
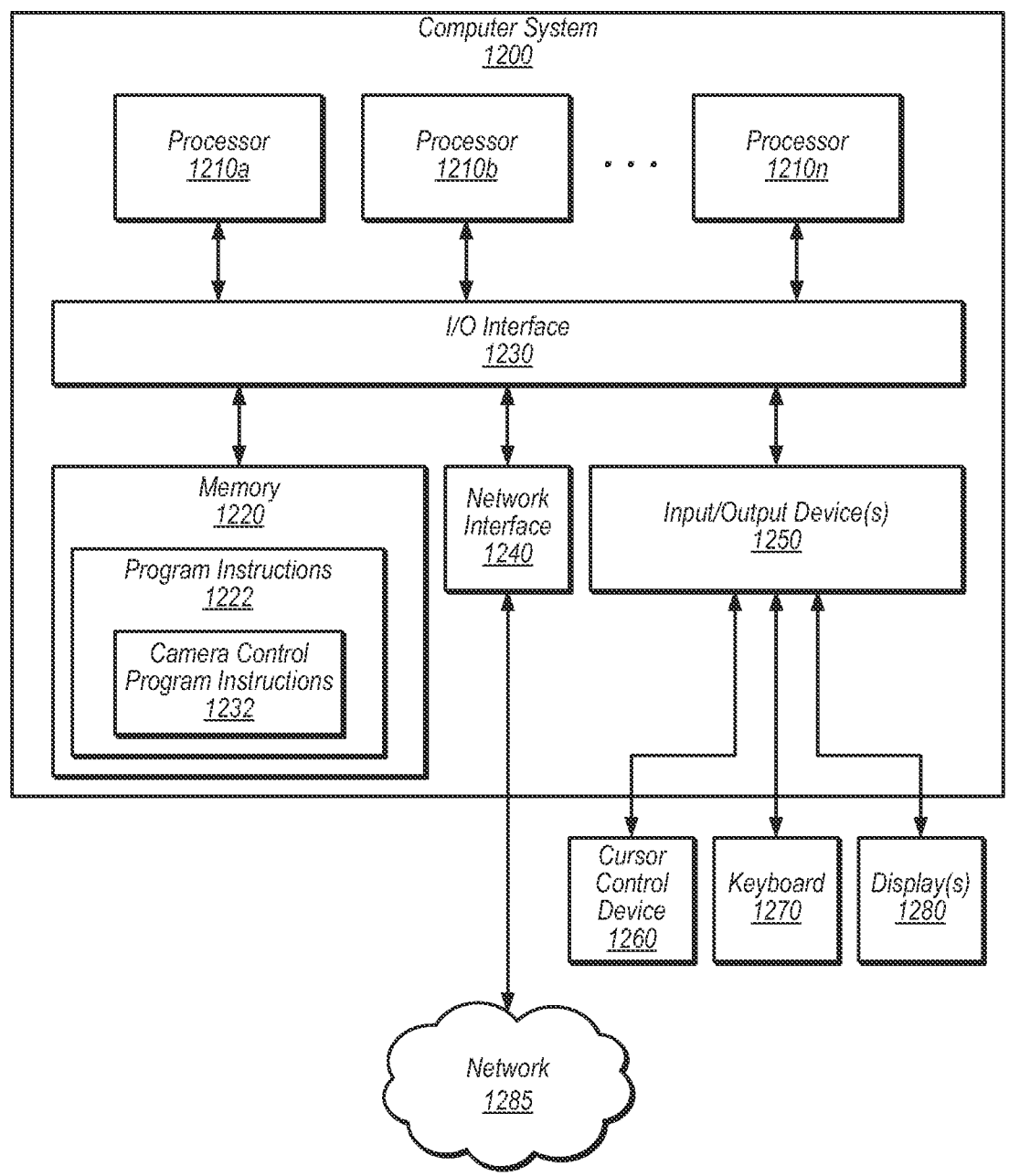
FIG. 12 illustrates an example computer system configured to implement aspects of the system and method for operating an image capture device.

FIG. 12 illustrates an example computer system configured to implement aspects of the system and method for operating an image capture device. FIG. 12 illustrates computer system 1200 that is configured to execute any or all of the embodiments described above. In different embodiments, computer system 1200 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for capturing images, as described herein, may be executed on one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 and/or existing state information and ownership transition condition data 1232 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a mapping application 1224 incorporating any of the functionality described above. Additionally, existing state information and ownership transition condition data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above, such as the methods illustrated by FIG. 8. In other embodiments, different elements and data may be included. Note that data 1232 may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An image capture device, comprising:
   two or more apertures for directing light to an image sensor device, wherein
      each of the apertures admits light from a different direction relative to the image sensor device; and
   one or more electrically switchable mirror elements configured for directing light from at least one of the one or more apertures to the image sensor,
   wherein upon application of a signal, a first electrically switchable mirror element enters a semi-reflective mode for reflecting light from a first aperture of the two or more apertures to the image sensor device,
   wherein, the light from the first aperture combines with light admitted from a second aperture of the two or more apertures, wherein the light from the second aperture is reflected to the image sensor device;
   wherein the image capture device is configured to capture an interlaced image at the image sensor device, wherein the interlaced image includes the light from the first aperture and the light from the second aperture.

2. The image capture device of claim 1, wherein the one or more electrically switchable mirror elements further comprise a second electrically switchable mirror element.

3. The image capture device of claim 2, wherein
upon application of another signal, the second electrically switchable mirror element enters a complementary semi-reflective mode for transmitting light from the second aperture of the one or more apertures to the image sensor device.

4. The image capture device of claim 2, wherein
the first aperture and the second aperture are equidistant from the image sensor device.

5. The image capture device of claim 1, further comprising:
the image sensor device; and
a moveable lens apparatus capable of moving a lens assembly of the image capture device relative to the image sensor device to compensate for a difference between a distance from the first aperture to the image sensor device and a distance from the second aperture to the image sensor device.

6. The image capture device of claim 1, wherein
the first aperture admits light from a location opposite the second aperture relative to the image sensor device.

7. The image capture device of claim 1, wherein
the first aperture is situated at a first distance from the image sensor device;
the second aperture is situated at a second distance from the image sensor device; and
the first distance is less than the second distance.

8. The image capture device of claim 7, further comprising:
a mirror element for directing light from the second aperture of the one or more apertures to the image sensor device.

9. The image capture device of claim 1, further comprising:
the image sensor device.

10. A method, comprising:
causing an image capture device having two or more apertures for directing light to an image sensor device to perform, upon application of a signal, placing a first electrically switchable mirror element in a semi-reflective mode for reflecting light from a first aperture of the two or more apertures to the image sensor device;
combining the light from the first aperture with light admitted from a second aperture of the two or more apertures, wherein the light from the second aperture is reflected to the image sensor device; and
capturing an interlaced image at the image sensor device, wherein
each of the apertures admits light from a different direction relative to the image sensor device, wherein the interlaced image includes the light from the first aperture and the light from the second aperture.

11. The method of claim 10, further comprising
upon application of another signal, placing a second electrically switchable mirror element in a semi-reflective mode for transmitting light from the second aperture of the one or more apertures to the image sensor device.

12. The method of claim 10, further comprising, causing movement of a lens assembly of the image capture device relative to the image sensor device to compensate for a difference between a distance from the first aperture to the image sensor device and a distance from the second aperture to the image sensor device.

13. The method of claim 11, wherein
the semi-reflective mode of the second electrically switchable mirror is activated at a time to complement the semi-reflective mode of the first electrically switchable mirror element.

14. A computing device, comprising:
a processor;
a display unit under control of the processor for displaying images captured by an image capture device;
an image capture device having two or more apertures for directing light to an image sensor device, wherein the image capture device is configured to perform:
upon application of a signal, placing a first electrically switchable mirror element in a semi-reflective mode for reflecting light from a first aperture of the two or more apertures to the image sensor device, wherein the light from the first aperture combines with light from a second aperture of the two or more apertures, wherein the light from the second aperture is reflected to the image sensor device; and
capturing an interlaced image at the image sensor device, wherein
each of the apertures admits light from a different direction relative to the image sensor device, wherein
the interlaced image includes the light from the first aperture and the light from the second aperture.

15. The computing device of claim 14, wherein the image capture device further comprises a second electrically switchable mirror element.

16. The computing device of claim 15, wherein the image capture device is further configured to perform:
moving a lens assembly of the image capture device relative to the image sensor device to compensate for a difference between a distance from the first aperture to the image sensor device and a distance from the second aperture to the image sensor device.

17. The computing device of claim 15, wherein:
a semi-reflective mode of the second electrically switchable mirror element is activated at a time to complement the semi-reflective mode of the first electrically switchable mirror element.

* * * * *